United States Patent [19]

Dewhirst

[11] Patent Number: 5,151,626

[45] Date of Patent: Sep. 29, 1992

[54] REPETITIVE PULSED RAMAN CELL WITH VIBRATING BLADE

[75] Inventor: Donald R. Dewhirst, Torrance, Calif.

[73] Assignee: Hughes Aircraft Company, Los Angeles, Calif.

[21] Appl. No.: 657,280

[22] Filed: Feb. 19, 1991

Related U.S. Application Data

[63] Continuation of Ser. No. 268,660, Nov. 2, 1988, abandoned, which is a continuation of Ser. No. 926,497, Nov. 4, 1986, abandoned.

[51] Int. Cl.$^5$ .......................................... H01L 41/08
[52] U.S. Cl. .................................. 310/331; 310/330; 310/332
[58] Field of Search ........ 310/327, 323, 328, 330–332, 310/800

[56] References Cited

U.S. PATENT DOCUMENTS

| | | | |
|---|---|---|---|
| 4,498,851 | 2/1985 | Kolm et al. | 310/331 X |
| 4,595,338 | 6/1986 | Kolm et al. | 310/331 X |
| 5,008,582 | 4/1991 | Tanuma et al. | 310/332 |

OTHER PUBLICATIONS

*Computers and Electronics*, p. 104, "A piezoelectric Cooling Fan", Mar. 1983.
Theory of Air Flow Generation By A Resonant Type PVF$_2$ Bimorph Cantilever Vibrator, by M Toda, Ferroelectrics 1979, vol. 22, pp. 911–918.
Scalable visible Nd:YAG pumped raman laser source, by D. G. Bruns et al., IEEE Journal of Quantum Electronics, vol. QE-18, No. 8, Aug. 1982, pp. 1246–1252.

*Primary Examiner*—Mark O. Budd
*Attorney, Agent, or Firm*—G. S. Grunebach; W. J. Streeter; Wanda K. Denson-Low

[57] ABSTRACT

In a Raman cell (10) which is subject to optical distortion of the path of a laser beam (40) by heating of the gas from the Raman conversion process, vibrating blades (50) cause the gas to mix and thus provide thermal homogeneity within the beam path.

6 Claims, 2 Drawing Sheets

REPETITIVE PULSED RAMAN CELL WITH VIBRATING BLADE

This is a continuation of application Ser. No. 07/268,660 filed Nov. 2, 1988, now abandoned, which is a continuation of copending application Ser. No. 926,497 filed Nov. 4, 1986.

BACKGROUND OF THE INVENTION

The present invention relates to apparatus for providing thermal homogeneity of a gas medium, particularly for preventing optical distortion in pressurized gas Raman cells.

Although the present invention has particular application for use in pressurized gas Raman cells, it is to be understood that its applicability is as pertinent in apparatus where uneven heating of the gas results in optical distortion. Specifically, the Raman scattering process deposits heat into the pressurized gas medium in the form of vibrational excitation of the gas molecules by a laser beam. The vibrational energy, which is imparted to individual gas molecules, rapidly thermalizes causing localized heating of the gas. In a static (nonflowing) Raman gas medium, an optical distortion is produced along the beam path that persists for several hundreds of milliseconds following each laser pulse. Typically the optically distorted beam path limits the Raman laser pulse repetitive frequency (PRF) to a few hertz unless the gas is circulated.

Such gas circulation has been effected in the past by means of an internal motor and fan to increase the PRF. In such a circulating gas mechanization, a vaneaxial blower moves gas around a closed path within the cell. The gas is distributed along the focused laser beam axis and is moved transverse to the beam axis to remove the heated gas from the beam path between laser pulses. Gas plenums, connecting to the blower, distribute the gas along the beam axis. The maximum PRF is determined by the clearing time to remove the disturbed gas from the beam path.

Such circulation has successfully increased PRF capability, but at the cost of significantly increased size and complexity of the cell. In addition, the motor and fan introduce undesirable materials into the cell interior, and dissipate several times more heat into the gas than is produced by the Raman conversion itself Winding insulation materials and bearing lubrication required by the motor outgas and limit cell life when operated for long term as a closed system. The approximate 10 watts of unwanted heat that are dissipated into the gas by the motor also adds to the difficulty of maintaining a uniform gas temperature within the beam path.

SUMMARY OF THE INVENTION

The present invention provides an alternate method of gas circulation by blades vibrated by piezoelectric bimorph flexure elements, which allow a compact and simple cell design relatively free from the problems referred to above.

Several advantages accrue from this simple design. Flow of gas around a closed loop is not required; thus the interior volume of the cell need be no greater than the volume occupied by the beam path and blades. The flexible blades and piezoelectric drivers contain no materials that can outgas, and dissipate very little heat into the gas.

Other aims and advantages as well as a more complete understanding of the present invention will be understood when taken in consideration with the following description and the accompanying drawings thereof.

DETAILED DESCRIPTION OF THE PREFERRED EMBODIMENT

Figure 1:
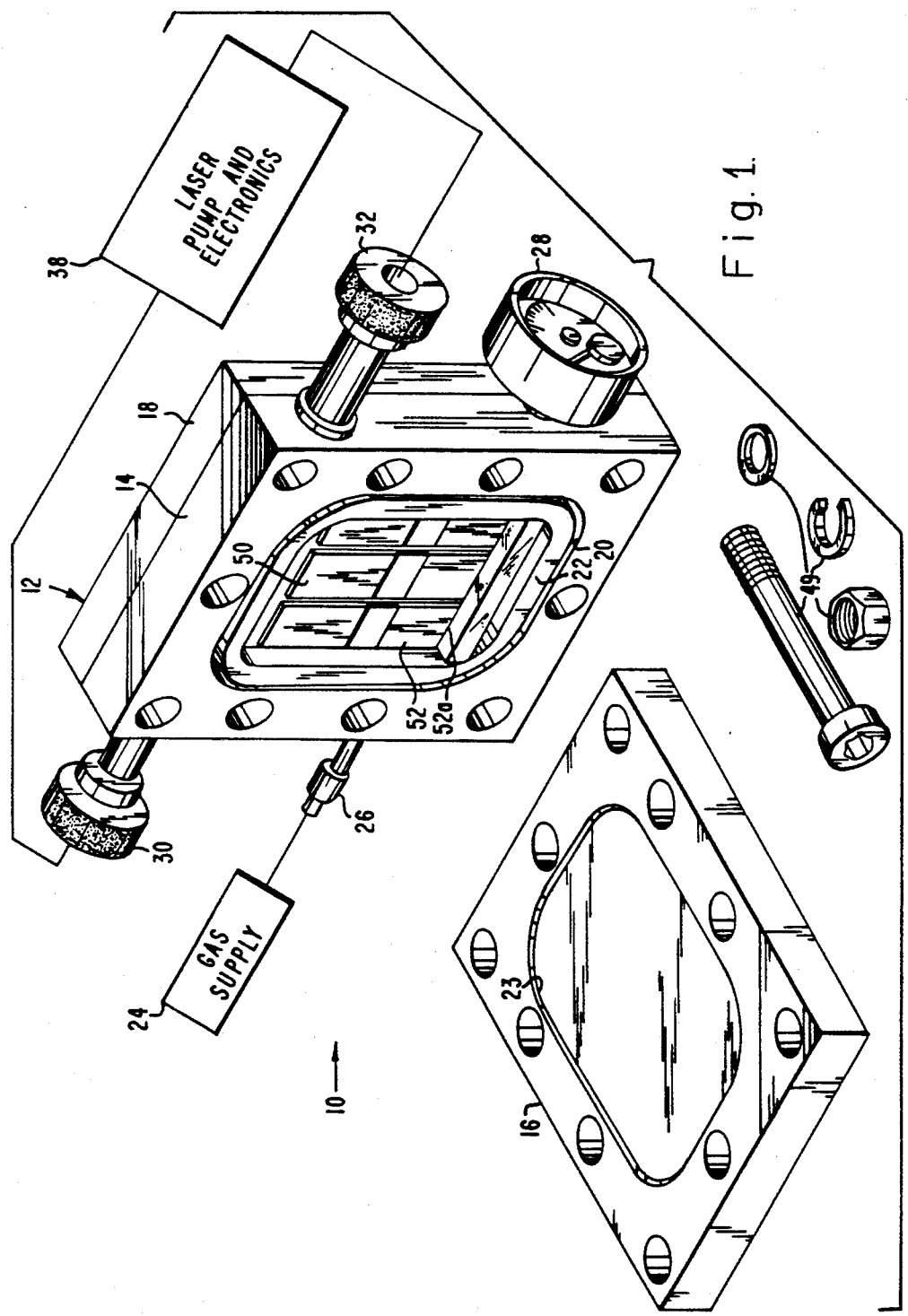
FIG. 1 is a view of a cell, with one side open to illustrate the inside thereof.
Figure 2:
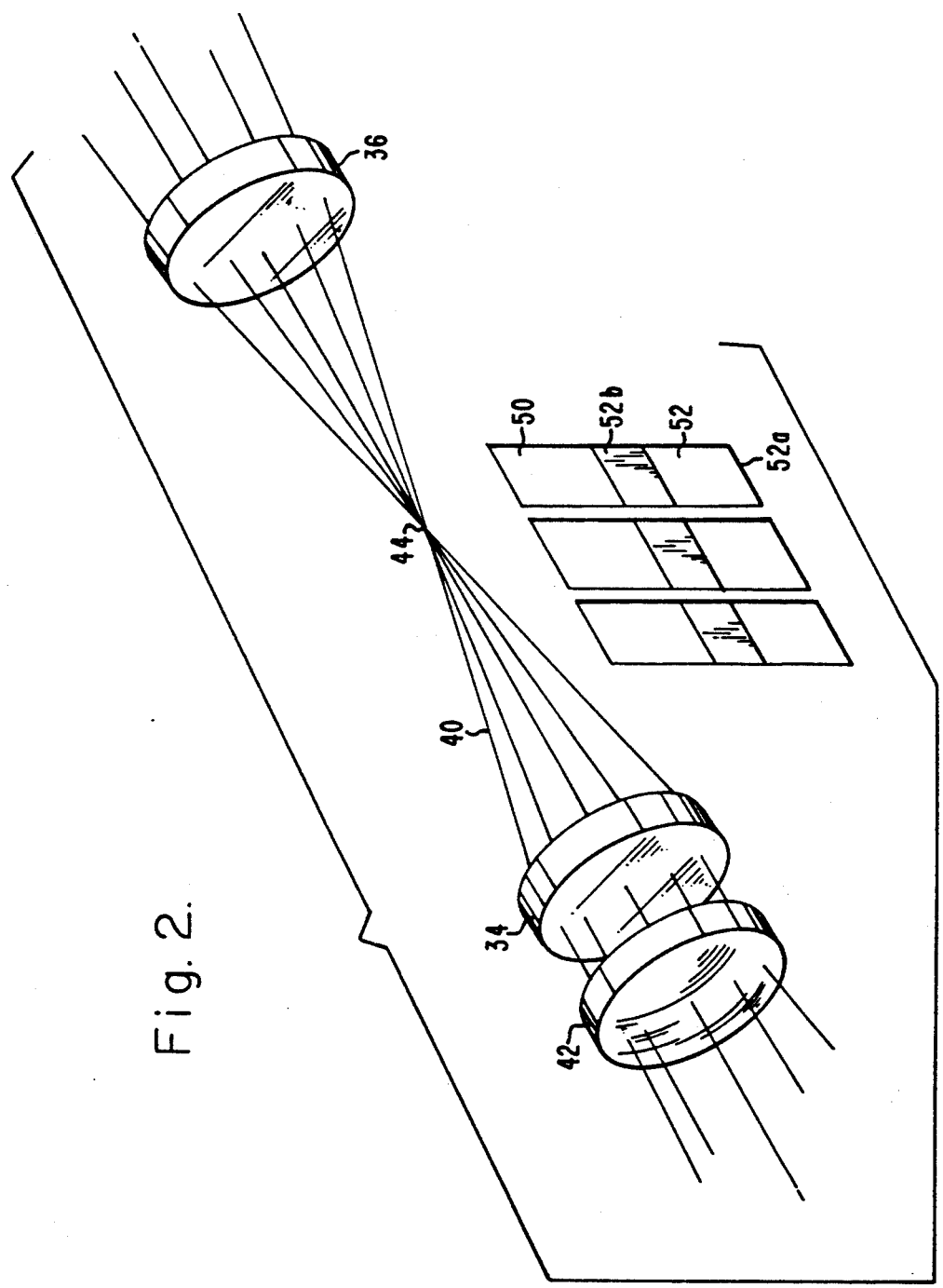
FIG. 2 is an isometric view illustrating portions of the construction and focussed beam within the cell depicted in FIG. 1.

As shown in FIGS. 1 and 2, a specific example of the present invention is illustrated as a Raman cell 10 comprising a housing 12 which is formed, for illustrative purposes, from a central portion 14 with side covers 16 and 18. The assembly is bolted together by bolts, nuts, washers and lock-washers generally denoted by indicium 19. A pair of 0-ring seals 20, one of which is shown, are placed between respective covers 16 and 18 and center 14. Center portion 14 is of generally annular shape to provide a cavity 22, and covers 16 and 18 may include recesses 23.

Gas under pressure is inserted into cavity 22 from a gas source 24 through a valve 26 in order to provide a proper amount of gas, such as methane, under pressure. A gauge 28 indicates the pressure level.

Tubular extensions 30 and 32 with windows 34 and 36 (FIG. 2) at the ends, through which a laser beam 40 enters and exits, are attached to center section 14. Laser beam 40 is provided by a laser pump and electronics, generally denoted by indicium 38, and may comprise a Nd:YAG laser or Nd:YAG frequency doubled pump laser capable of hundreds of millijoules per pulse repetitive frequencies (PRF's) of the order of 30 Hz. Other lasers, as well as gases other than methane, e.g., hydrogen and deuterium, may be utilized for and within cell 12. When energized, pump laser and electronics 38 provides beam 40 which is focused by a lens 42 to converge generally at a point 44 between windows 34 and 36.

During normal operation, the focusing of beam 40 between windows 34 and 36 and consequent stimulated Raman scattering causes the gas to be heated, and optically distorts the beam following each laser pulse.

The present invention prevents such localized heating of the gas and consequent optical distortion by utilizing one or more vibrating blades 50 driven at resonance by piezoelectric bending elements 52. Such elements 52 are sometimes referred to as piezoelectric bimorphs or piezoceramic flexure elements. Blade 50 and driver 52 are sometimes referred to as piezoelectric bimorphs or piezoceramic flexure elements. Blade 50 and driver 52 combinations have been used as fans, such as in quadrature fans, produced by Piezo Electric Products, Inc., of Cambridge, Mass. and Metuchen, N.J. The peizoelectric bimorph is also available from Philips Electronics. Piezoelectric bimorphs are formed by thin piezoelectric bonded to both sides of a thin metal strip and poled in opposite directions so that, when a voltage is applied between the electrodes on their outer surfaces, one strip expands lengthwise while the other contracts to produce a differential strain. When the piezoelectric bimorph is fixed at one end to form a cantilevered construction, the free end is displaced by a distance. Such a transducer is described in "Piezoelectric Ceramics," J. Van Randeraat and R. E. Setterington, Publications Department, Electronic Components and Materials Division, N. V. Philips' Gloeilampenfabrieken, Eindhoven, The Netherlands, first edition June 1968, second edition January 1974, pages 40–42.

As shown in FIGS. 2 and 3, the vibrating blades comprise thin flexible strips, such as of mylar, having a relatively large area and a small thickness whose free ends are disposed adjacent to the axis of beam 40. It is to be understood, however, that any other angling of blades 50 with respect to the beam may be utilized, the aim thereof being to sufficiently disturb the gas localized in the beam path and to move and mix the gas to ensure that the gas medium rapidly becomes thermally homogeneous after each laser pulse.

There is no specific number of blades and piezoelectric drivers required. However, it has been found acceptable to form a cell with a center section containing a number of the vibrating blades and spanning approximately one-third of the focused beam path. Beam focus lens 42 is displaced outside entrance window 34 and is positioned to locate beam focus 44 approximately at the center of the section containing the vibrating blades. The windows are separated sufficiently so that the laser beam intensity will not damage the coated window surfaces. As shown, one end 52a of each driver 52 is bonded or otherwise anchored to central housing 14 while the other end 52b is bonded to blade 50. Upon energization, the vibrating blades move the gas locally within beam 40 so that the gas is well mixed within the laser beam path. A thermally homogeneous mixture of gases are thus maintained in the focused portion of the pump beam where the gas is heated by the Raman converion process. Because the piezoelectric elements generate very little heat of their own, the gases are heated only by the Raman process. Heat conduction to the cell walls is sufficient to maintain the gas near ambient temperature.

A vibrating blade Raman cell employing the principles of the present invention has been constructed and tested with methane gas placed under pressure. The pump laser used was a multimode Nd:YAG laser operating at 175 mj/pulse output energy and at 25 Hz. At this pump input, 50 mj/pulse of Raman shifted energy was obtained. The Raman laser beam divergence and output energy at 25 Hz were essentially unchanged from that for low PRF, whereas the static cell (that is, with the blades inactive) could not be operated greater than 1 Hz without significantly degraded beam divergence and unstable Raman output energy. Thus, the effectiveness of the gas circulation effected by the present invention was demonstrated.

Although the invention has been described with reference to a particular embodiment thereof, it should realized that various changes and modifications may be made therein without departing from the spirit of scope of the invention.

What is claimed is:

1. In a Raman gas cell comprising: a sealed enclosure, a gas contained within said sealed enclosure under pressure for providing a Raman conversion process, and means defining a laser beam path through said gas within said sealed enclosure; and wherein a laser beam traversing said path and having a focus within said sealed enclosure is subject to optical distortion by heating of said gas from the Raman conversion process along said beam path;

the improvement consisting of at least one vibrating blade and means for driving said vibrating blades, said vibrating blades being positioned centrally within said sealed enclosure spanning approximately one-third of said beam path to agitatingly disturb said gas within said beam path so that a thermally homogeneous mixture of said agitated gas is provided within said beam path to thereby prevent optical distortion of said focused laser beam caused by localized heating of said gas from the Raman conversion process along said beam path.

2. The improvement according to claim 1 wherein said means for driving said vibrating blades comprises at least one piezoelectric bending element coupled to said vibrating blade.

3. The improvement according to claim 1 wherein said vibrating blades are arranged to vibrate transverse to said beam path with their free ends adjacent to said beam path.

4. In a Raman gas cell comprising:
a sealed enclosure,
a gas contained within said sealed enclosure under pressure for providing a Raman conversion process, and
means defining a laser beam path through said gas within said sealed enclosure;
and wherein a focused laser beam traversing said path and having a focus with said sealed enclosure is subject to optical distortion by heating of said gas from the Raman conversion process along said beam path;
the improvement consisting of a plurality of vibrating blades and means for driving said vibrating blades, said vibrating blades being centrally positioned within said sealed enclosure at least one-third of the distance within said beam path to agitatingly disturb said gas in a non-circulating manner within said beam path so that a thermally homogeneous mixture of agitated gas is provided within said beam path to thereby prevent optical distortion of the focused laser beam caused by localized heating of said gas from the Raman conversion process along said beam path.

5. The improvement according to claim 4 wherein said means for driving said vibrating blades comprise piezoelectric bending elements coupled to said vibrating blades.

6. The improvement according to claim 4 wherein said vibrating blades are arranged to vibrate transverse to said focused laser beam path their free ends adjacent to said beam path.

* * * * *